United States Patent Office 3,006,737
Patented Oct. 31, 1961

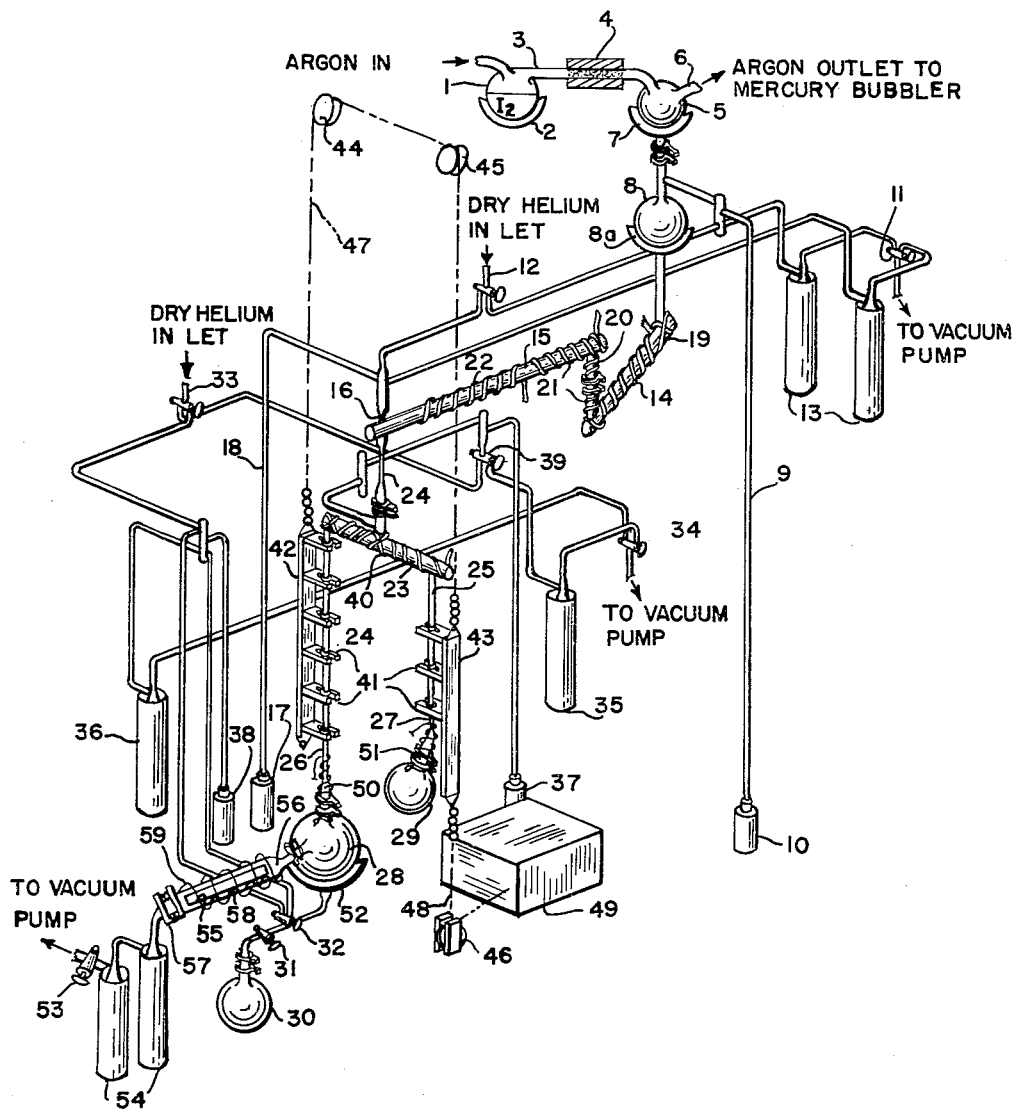

3,006,737
APPARATUS FOR CONTINUOUS PREPARATION OF ULTRAPURE SILICON
Guy H. Moates, Bedford, Bernard Rubin, Arlington, and Walter B. Jackson, Waltham, Mass., assignors to the United States of America as represented by the Secretary of the Air Force
Filed June 2, 1959, Ser. No. 817,686
4 Claims. (Cl. 23—264)
(Granted under Title 35, U.S. Code (1952), sec. 266)

The invention described herein may be manufactured and used by or for the United States Government for governmental purposes without payment to us of any royalty thereon.

This invention relates generally to the production of silicon and more particularly to the preparation of ultrapure silicon.

The importance of silicon has increased for both civilian and military applications as a high temperature material for semiconductor devices; however, the complete utilization of this versatile material has been inhibited by the lack of a method or process and apparatus that will economically and with a high degree of predictability produce silicon with a desired lack of impurities.

Heretofore, discontinuous processes or steps have been used; however, there are a number of inherent limitations in this type of processing. There is generally contamination of the solvent by diffusion from the container material, contamination resulting from the transfer of material, a great deal of time consumed in repeated transfers, a limitation on the quantities of material capable of being purified, a lack of uniformiaty between the separate batch end products, and absorbtion of moisture due to the hygroscopic properties of $SiI_4$.

The continuous process of this invention involves a synthesis of $SiI_4$, silicon tetraiodide, a sublimation step, a zone purification processing, and finally a decomposition to obtain ultrapure silicon. These steps are performed by a closed apparatus wherein material is transferred in situ thereby eliminating contamination, time consuming transfer operations and the limitation on the batch quantity size. The material transferred to the receivers is uniform; the chemical and physical properties having undergone the same processing to the same degree under the same conditions. Furthermore, leaching from the containers has been minimized by reusing the same containers, and hydrolysis, water and oxygen absorption, have been eliminated by utilizing a controlled atmosphere.

Accordingly, it is an object of this invention to provide a continuous uncontaminated method and apparatus therefor for producing ultrapure silicon.

It is another object of this invention to produce ultrapure silicon which is boron free.

It is still another object of this invention to produce a method and apparatus for obtaining ultrapure silicon which eliminates the disadvantages of discontinuous, batch processing.

It is a further object of this invention to produce a method and apparatus for obtaining ultrapure silicon involving a synthesis of $SiI_4$, a sublimation operation on the $SiI_4$, a zone refining of the compound, and finally, a decomposition to obtain uniform, ultrapure silicon.

It is a still further object of this invention to produce a process and apparatus for obtaining ultrapure silicon which is economical to manufacture and the apparatus of which is composed of conventional, currently available materials that lend themselves to standard mass production manufacturing techniques.

These and other advantages, features and objects of the invention will become more apparent from the following description taken in connection with the illustrative embodiment in the accompanying drawing, wherein the figure is a partially schematic representation of an apparatus which illustrate the steps of obtaining ultrapure silicon.

Referring to the figure, the first step in the process of producing ultrapure silicon involves the step of synthesizing silicon tetraiodide. Iodine ($I_2$) is placed in a container 1 which is heated by a heating mantle 2. A source of argon is presented to the container to flush the iodine vapors through a tubular section 3 which contains silicon. A heating unit 4 surrounding the silicon section 3 aids in the reaction between the elements to give silicon tetraiodide $SiI_4$, which deposits in container 5 which has an outlet 6 which goes to a mercury bubbler (not shown) for the argon gas. Container 5 forms the feed hopper which may be heated by a heating unit 7 to melt the $SiI_4$ down into a presublimed reservoir 8 preparatory to the sublimation stage of the process. Provision is made for a release of high pressures in the system by means of a tube 9 connected between the containers 7 and 8 and lying in a pool of mercury in a container 10. High pressure produces a bubbling action in the mercury to release the excessive pressure. A vacuum pump controlled by valve 11 and a dry helium input controlled by valve 12 are used simultaneously to clean or flush out the system while the high vacuum pump alone is used to reduce the pressure for the sublimation step of the process. A pair of cold traps 13 containing liquid nitrogen are provided to deposit out any $SiI_4$ that might be drawn toward the pumps.

The application of heat at 8a to the presublimed $SiI_4$ reservoir 8 allows flow of the melted material into sublimation hopper 14 which is filled along its length to about fifty percent capacity with $SiI_4$. The system is evacuated by the connection of the sublimation manifold 15 at 16 to the flow stream of the system. The dry helium and vacuum pump connections at 12 and 11, respectively, are also connected to the sublimation manifold for the performance of their function with respect to sublimation section of the device. A separate container 17 with mercury and its connection 18 with sublimation manifold 16 provide the safety valve feature for this section of the device in the same manner as that described relative to elements 9 and 10.

The sublimation system is evacuated to a pressure of approximately 25 mm. mercury and the hopper 14 heated to a temperature of about 100° C. by lagging with an electrical heating tape 19 in order to transform the material from a solid to a gaseous state. The connection 20 between the hopper 14 and manifold 15, and approximately the first seventy five percent of the manifold are similarly wrapped with tapes 21 and 22. The voltages to the tapes (not shown) are so regulated as to create a temperature gradient ranging from 100° C. to 70° C. across the system.

The $SiI_4$ in gaseous form moves from hopper 14 to manifold 15 and is sublimed down the manifold. Silica and less volatile iodides remain as sublimed in the hopper while the more volatile silicon iodide homologues, certain low melting impurity iodides, and occluded iodine are pumped off and entrapped in the liquid nitrogen traps 13. Periodically, increments of the heating tape 22 along the manifold are moved toward a zone hopper. Sublimed $SiI_4$ then condenses on the manifold adjacent to the end of the heating tape. The heat is then shut off, the dried deoxygenated helium from valve 12 is bled into the system to a pressure of one atmosphere, and the sublimed $SiI_4$ is melted from the sublimation manifold to the zone hopper 23. A constricted tube at 24 from the manifold 15 to the zone hopper 23 is provided in order to serve as a plug former in lieu of a stop cock after most of the $SiI_4$ has flowed into the zone hopper.

This solid plug of $SiI_4$ enables one to maintain two separate atmospheres remote from each other, but capable of unification by melting the plug by a heat means.

The next step of the process comprises a zone purification of the $SiI_4$ and is comprised of the system disclosed in our co-pending application, Serial No. 817,688 titled "Reciprocating Zone-Void Purification," filed on even date herewith which utilizes the principles of zone refining to which void forming has been added. Basically, the zone purifier is a continuous zone-void refiner wherein the zone hopper 23 has a pair of tubes 24 and 25 attached at the ends thereof and extend downward, perpendicular to the longitudinal axis of the hopper 23. At the bottom of each tube a junction is formed with an extension of the tube having about ¼ the diameter of the main tube. The constricted extensions 26 and 27 are void formers which are connected with product receiver 28 and waste receiver 29, respectively. A forerun receiver flask 30 is connected with product receiver 28 to drain off the forerun once the receiver has reached a steady state at partial reflux. After transfer of the forerun, the receiver may be disconnected from the system by means of a valve unit 31. A double stop cock 32 is connected between containers 28 and 30 in order to connect the zone system with the flow stream. A source of dry helium controlled by valve 33, a valve 34 connected with a vacuum pump, cold traps 35, 36, mercury bubbler type safety valves 37, 38, valve 39 connected with the zone hopper 23, and associated tubing connections comprise the flow stream for the zone section.

The feed material stored in hopper 23 is maintained in a molten state by wrapping the hopper with heating tape 40 and applying a voltage source (not shown) thereto. A series of resistance heaters 41 are spaced along the tubes or ampoules 24 and 25 and are movable vertically by the support means 42, 43 adjacent each tube 24, 25. The support means may be constrained by means of a trackway and roller bearings (not shown) to avoid any binding action with the tubing. The supports 42 and 43 are connected to operate together by means of a set of pulleys 44, 45, 46, and cable or chain means 48 for operation by a drive means 49 which is disclosed in co-pending application, Serial No. 700,924 by Walter B. Jackson, filed December 5, 1957, now Patent No. 2,952,722, titled "Reciprocating Zone Purification." The heaters 41 in the support means are comprised of heat treated lava wrapped with nichrome wire and are connected in parallel with a voltage source. The pulleys and drive mechanism 49 are arranged to move the heaters on the product side slowly upward while the heaters of the waste section are moved downwards. At the end of the cycle, the heaters are quickly returned to their original position. The figure shows the heaters just prior to the quick return stroke. Auxiliary resistance heaters 50 and 51 are provided from receivers 28 and 29 part way up void formers 26 and 27 respectively. Sufficient current is passed through these wires to prevent clogging of the material and assure flow of the product and waste to the receivers. The auxiliary heater on the waste side is wire to a Variac via an automatic timing device (not shown) so that the heater operates for only twenty minutes during each three cycles of the supports.

As the heaters on the enriching side progress up the arm, the molten zones travel with them. The material at the bottom of the void former 26, which is melted out by the bottom heater, is collected in the receiver 28. As the bottom heater progresses up the length of the void former, material drips down from above the heater and solidifies below; thus, a void equal to the normal void-former zone length is created. Movement of this heater causes this void to move up the void former to the junction with its main arm or tube. After the heaters reciprocate, the bottom heater of the main arm melts material into the void until 22 percent of its zone is drained.

Thus, the void is transferred to the main column as a void equal to 22 percent of the effective heater length. During the second cycle a new void is formed and the original void is carried to the second main heater. This sequence repeats itself until a void is transferred to each zone. Finally, the transport of the top void to the hopper allows for replenishment of material and rejection of solute impurity.

Simultaneously with the creation of voids and their movement upwards with the zones on the enriching side 24, a void is formed on the stripping side 25. The first zone carried down by the heater associated with this void former 27 is completely melted into the waste receiver 29. The second zone carried down during the succeeding cycle freezes in the void-former tube because the auxiliary heater is now off. During the third cycle there is formed a void equal to twice the effective heater length. This void is transferred to the main arm by a "filling in" process, and subsequently, transferred up the main arm by this same intermittent process. Thus, on the stripping side a void equal to 55 percent of zone length is carried intermittently up the arm to the hopper. Because the auxiliary heater is timed to operate at six-hour intervals, one void is created for every third cycle.

The desired requirements for a continuous multistage separation are thus satisfied. Molten zones carrying material in opposite directions, a continuous feed of material from the hopper to the rising voids, and reception of product and waste are all established.

A heat mantle 52 and product receiver 28 aids in the flow of the fore-run material and also is used to heat the product material for presentation to the next stage of the process, the decomposition stage. A valve 53 is connected with a high vacuum pump for operating this section at a vacuum in order to allow vaporization of the material in the system from its solid state. Liquid nitrogen filled cold traps are utilized to protect the pump. The $SiI_4$ in product receiver 28 is vaporized by the heat applied thereto and is passed over an ultra-pure, single crystal silicon bar 55 which is supported in a section of tubing 56 which is separable at a ball joint 57. Small internal projections of Pyrex or quartz 58 within the tube 56 allow for the free flow of the $SiI_4$ gases around and by the crystal 55. A high frequency induction heating coil 59 heats the silicon bar to a temperature of from 1000–1200° C. and preferably, for higher yields, at 1180° C. to cause a deposition of the pure silicon on the crystal while the iodine and some $SiI_4$ travel to the cold traps.

Both the sublimation section and the zone refining section utilize a low boron quartz for the apparatus material. In addition, various mercury monometers may be provided to monitor the pressure throughout the system.

Thus it can be seen that a complete, uncontaminated, continuous process has been presented to obtain ultra-pure silicon which consists of a synthesis section operating at highly greater than one atmosphere of argon of a quartz sublimation section which operates under a separate atmosphere from the rest of the system and utilizes a vacuum for sublimation and one atmosphere of helium for transferring the product to the next stage, a zone refining stage utilizing the zone-void principle and operating at one atmosphere of dry, deoxygenated helium and a decomposition system operating under a vacuum. Each section is connected to but separate from the adjacent stages with regard to the separation of atmospheres by valve or plug means.

Although the invention has been described with reference to a particular embodiment, it will be understood to those skilled in the art that the invention is capable of a variety of alternative embodiments within the spirit and scope of the appended claims.

We claim:

1. An apparatus for obtaining ultrapure silicon comprising a synthesis unit for obtaining $SiI_4$, said synthesis unit comprising a container for $I_2$, means to apply heat to said container, a container for $SiI_4$, means connected between said containers with Si therein, heat means for said last-mentioned means, and means for passing an inert gas over said heated $I_2$ and through said Si to deposit $SiI_4$ in its container; a sublimation section, means connecting said sublimation section with said container for $SiI_4$, means to heat the $SiI_4$ in its said container to allow the material to flow into said sublimation section which comprises a hopper connected with said last-mentioned connecting means, a manifold connected with said hopper, means for heating said hopper and manifold, and means for applying a vacuum to said sublimation section; a zone refining section comprising a zone hopper connected to said manifold to receive sublimed $SiI_4$ from the sublimation manifold, an enriching ampoule connected at one end of said zone hopper, a stripping ampoule connected at the other end of said zone hopper, heat supply means on said zone hopper, spaced heat supply means at predetermined intervals on each of said ampoules, means for reciprocating said spaced heat means, a void former in each ampoule, a receiver for each ampoule having a connection thereto at the end remote from the hopper end of the ampoule, and means for supplying an inert atmosphere to the zone-void section; a decomposition section, means connecting the decomposition section with the receiver from said enriching ampoule, heat means for said enriching ampoule receiver, said decomposition section comprising a vacuum pump means for evacuating said decomposition section, a container for an ultrapure single crystal silicon bar, means for heating said silicon bar such that said $SiI_4$ from said enriching ampoule receiver is caused to pass over said heated bar to deposit ultrapure silicon thereon.

2. An apparatus as defined in claim 1, including apparatus for flushing each section.

3. An apparatus as defined in claim 1 wherein each section is capable of being maintained at separate atmosphere conditions from each other.

4. An apparatus as defined in claim 1 wherein each section is capable of being blocked from the atmosphere of its adjacent sections.

References Cited in the file of this patent

UNITED STATES PATENTS 2,895,858     Sangster _____ July 21, 1959

FOREIGN PATENTS 1,154,281     France _____ Apr. 4, 1958

OTHER REFERENCES

Litton et al.: Journal of the Electrochemical Society, vol. 101, No. 6, June 1954, pp. 287–292.

Chemical Engineering, August 1957, pp. 164–165.

Sangster et al.: Journal of the Electrochemical Society, vol. 104, No. 5, May 1957, pp. 317–319.

Szekely: Journal of the Electrochemical Society, vol. 104, No. 11, November 1957, pp. 663–667.

Wilson: article on Research, vol. 12, 1959, pp. 93 and 96.